April 13, 1965 P. KERN 3,178,511

DISTORTION CORRECTION OF TELEGRAPH SYMBOLS

Filed July 7, 1961 2 Sheets-Sheet 1

Inventor
Peter Kern
By [signature] Atty.

April 13, 1965 P. KERN 3,178,511

DISTORTION CORRECTION OF TELEGRAPH SYMBOLS

Filed July 7, 1961 2 Sheets-Sheet 2

Inventor:
Peter Kern.
By [signature] Atty.

United States Patent Office 3,178,511

Patented Apr. 13, 1965

3,178,511

DISTORTION CORRECTION OF TELEGRAPH SYMBOLS

Peter Kern, Munich, Germany, assignor to Siemens & Halske Aktiengesellschaft Berlin and Munich, a German corporation Filed July 7, 1961, Ser. No. 122,430
Claims priority, application Germany, July 19, 1960, S 69,472
8 Claims. (Cl. 178—69)

Figure 1:
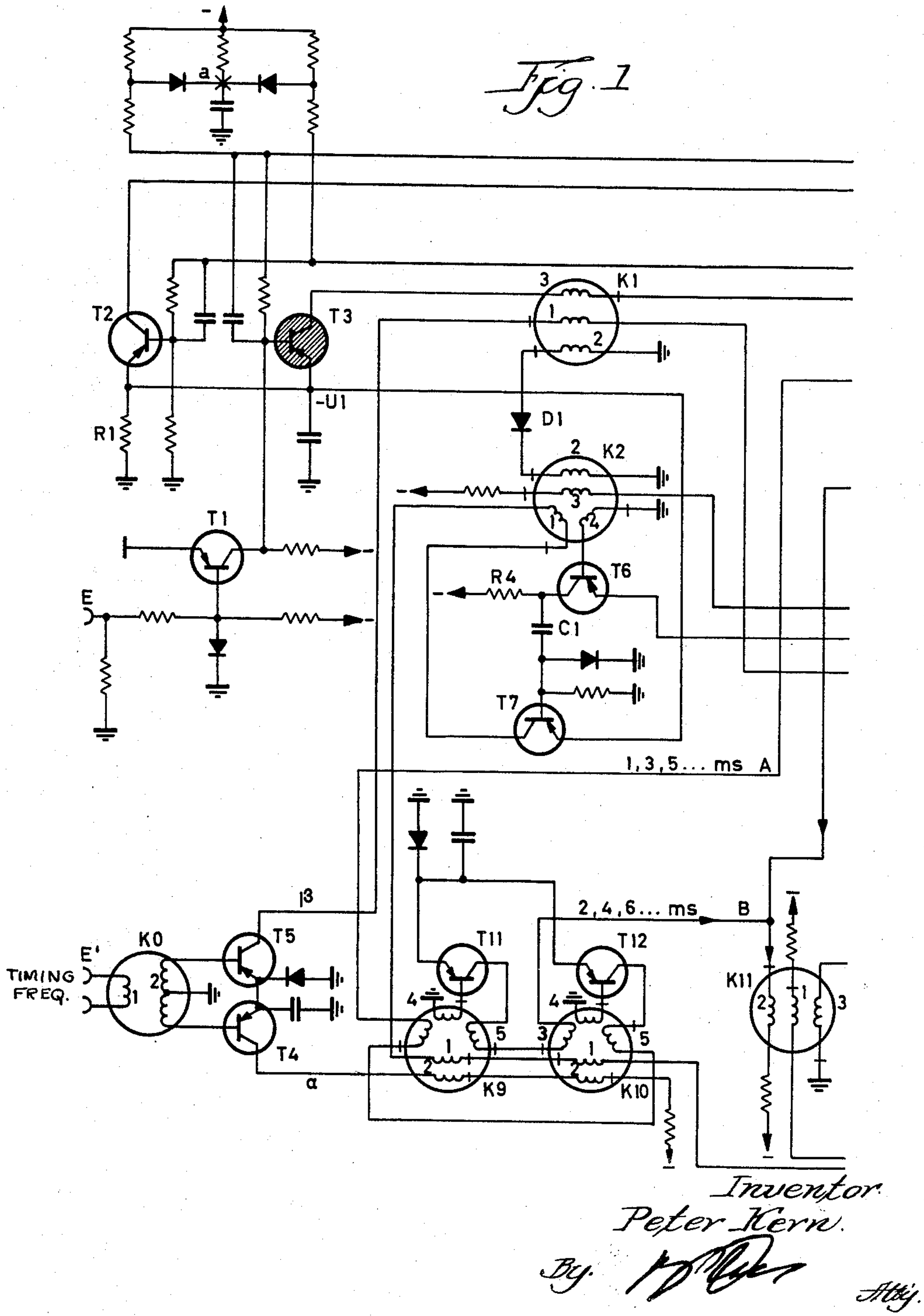

The invention disclosed herein relates to distortion correction of telegraph symbols, and is particularly concerned with a distortion correcting circuit arrangement which combines the advantages of known distortion correction devices, providing additional improvements going therebeyond, and which can be produced at lower cost.

Distortion correcting devices operate in principle as follows:

Upon receipt of the start element of a telegraph symbol, a timing circuit becomes operative which delivers short scanning or sampling pulses for the instants of operatively effective scanning of element centers related to the inception or beginning of the start element. These pulses scan or sample the polarity or potential of the elements of transmitted telegraph symbols and extend the sampled potential, at the sampling instants, to an output circuit which is operative to again form therefrom the respective telegraph symbols. The timing circuit ceases to deliver sampling pulses after a predetermined time which corresponds approximately to the duration of a telegraph symbol, and is operatively restarted again responsive to the next following element having start potential. There are a number of distortion correction devices known which operate in accordance with this principle.

There is also known a distortion correction device which is operative to extend to its output, in the pauses between two telegraph symbols, the potential which is present at its input. There is for this purpose provided a bypass over a socalled switch-through device, over which the potential at the input can be switched through to the output even after cessation of a telegraph symbol. This requires a considerable additional circuit expenditure.

The operation of another known distortion correcting device is stopped, after giving off a predetermined number of sampling pulses, only when there is during the last sampling pulse stop-potential at the input. If this is not the case, further sampling pulses will be delivered until stop-potential appears at the input, when the distortion correction device is by the action of the last sampling pulse returned to the initial position. Accordingly, telegraph symbols, with five or six code elements, can be transmitted. This likewise requires great circuit expenditure.

As noted before, the primary object of the invention is to provide a distortion correction device which combines the advantages of known distortion correction devices, and in addition thereto further advantages, and which can be produced at lower cost.

In accordance with the invention, this is accomplished by the provision of several features, including the provision of an element counter which is stepped by the sampling pulses, required for the element center scanning, such counter, after attaining a given counting result, retaining such result irrespective of the appearance of further sampling pulses, and conducting to a gate circuit pulses, coinciding with further sampling pulses, such gate circuit becoming conductive for these pulses upon appearance of stop element potential (polarity) at the input of the distortion correction device and preparing the release of a stop pulse which will restore the circuit arrangement to initial position. Moreover, sampling pulses are released by the counters even in the initial position of the circuit, that is, after the appearance of a stop pulse, whereby the potential at the input of the distortion correction device is also sampled and extended to the output, in the pauses between the individual telegraph symbols; the counters being restored to zero position only responsive to the appearance, following the stop pulse, of a start element potential at the input of the distortion correction device, which signifies initiation of a new distortion correction cycle. A sampling during the pauses between the individual telegraph symbols is thus made possible in simple manner, by the initial position which deviates from that of the customary distortion correction devices, and by effecting the restoration of the counters into the zero position only upon appearance of the start element of the next following telegraph symbol. The operation of the counter, which is, as compared with counters used in prior systems, not restored upon attaining a given counting value, and which delivers output pulses coincident with each further sampling pulse, results in cooperation with the noted gate circuit in simple manner in an extension or prolongation of the distortion correction cycle.

In an advantageous embodiment, an auxiliary impulse is conducted to the counter which counts the pulses of a timing pulse of higher frequency, depending upon the appearance of the sampling pulse preceding the stop pulse. The application of the auxiliary pulse to the counter, at an appropriate instant, will result in shortening the stop element by 2 milliseconds (at a telegraph speed of 50 baud) corresponding to the CCITT-Recommendation B21.

The use of magnet cores with approximately rectangular hysteresis loop is particularly advantageous as it results in simplifications and low cost circuit construction.

Figure 2:
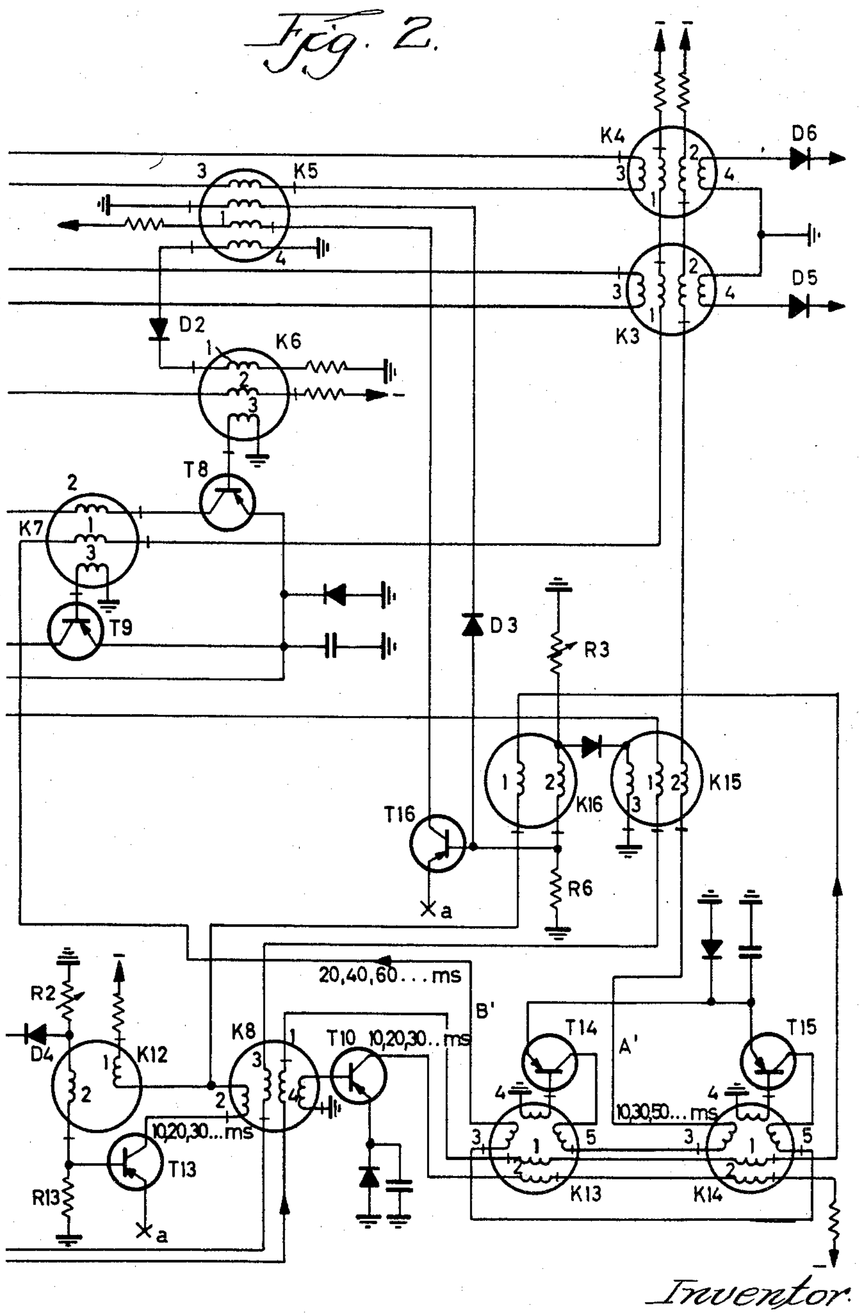

Details of the invention will now be explained with reference to the accompanying drawings, wherein FIG. 1 shows part of the circuit arrangement according to the invention; and FIG. 2 shows another part thereof.

FIG. 1 should be placed at the left of FIG. 2, with corresponding horizontal lines in alignment.

For simplification, only the circuit elements required for an understanding of the operation are shown in the drawings and will be referred to in the following explanations. The increments of time, indicated to give examples, refer to a telegraph speed of 50 baud; they are to be appropriately changed in case of different telegraph speeds.

The telegraph symbols which are to be corrected are supplied to the input E (FIG. 1). It shall first be assumed that the distortion correction device has been seized but that there are for the moment no telegraph symbols at the input. There is in such case positive potential at the input E. The transistor T1 is accordingly at cutoff, and the transistors T2 and T3 of the input flip-flop circuit will be respectively at cutoff (T2) and conductive (T3). The collector current of the transistor T3, flowing through the windings 3 of the magnet cores K1 and K3, maintains these magnet cores at negative saturation.

To the input E′ (FIG. 1) is conducted a timing frequency of 1000 cycles which is applied to magnet core K0. The transistors T4 and T5 become over the winding 2 alternately conductive and blocked, thus resulting in two timing pulse sequences $\alpha$ and $\beta$ which are phase shifted by 180°.

In case there appears now a start element of a telegraph symbol, placing negative potential on the input E, the transistor T1 will become conductive and the transistor T3 will consequently be blocked while the transistor T2 will become conductive. The magnet core K1 returns from the negative saturation to the negative remanence position and is, by the next successive timing pulse of the timing phase $\beta$, oppositely magnetized over the winding 1. An impulse is thereby produced in the output winding 2, which is extended over the rectifier D1 to the input winding 2 of the magnet core K2, which is likewise in the negative remanence position, thereby effecting opposite magnetization of the magnet core K2. This induces in the winding 4 a voltage which makes the transistor T6 conductive, thereby effecting quick discharge of the capacitor C1. This discharge operation makes the transistor T7 conductive and the capacitor C1 is again slowly charged over the emitter-base circuit of the transistor T7. The bias for the transistor T7 is thereby derived from the emitter resistor R1 of the transistor T2. This makes the impulse given off from the transistor T7, which is used as a short impulse, relatively long (for example, 100 microseconds). This is necessary so that the start impulse can place the magnet cores K9, K10, K8, K13, K14, K16 and K12, over the winding 1 thereof, into a predetermined remanence position, corresponding to the zero position of the counter, which comprises these cores.

The counter also comprises a distributor which is substantially formed by the magnet cores K9 and K10. This distributor is operated as a ring counter, with a timing phase $\alpha$, over the windings 2 of the magnet cores K9 and K10. It divides the timing frequency of 1 kilocycle, conducted thereto, in a ratio of 2:1, so that timing pulses, spaced by 2 milliseconds, are given off at its outputs, such timing pulses being mutually phase shifted by 180°. The operation of the distributor is as follows:

Upon appearance of the start impulse, the magnet core K10 is over its winding 2 oppositely magnetized by the first timing pulse of the timing phase $\alpha$. A voltage is thereby induced in the winding 4 which makes the transistor T12 conductive. Oven the winding 5, which represents a positive feedback, is extended an output pulse to the winding 3 of the magnet core K9, which is thereby oppositely magnetized, the output pulse being thus also extended to the output line A. The next timing pulse of the timing phase $\alpha$ now magnetizes the magnet core K9, thereby inducing a voltage in the winding 4, which is effective to make the transistor T11 conductive. Over the winding 5, which represents a positive feedback, if extended an output pulse to the winding 3 of the magnet core K10, such pulse again oppositely magnetizing the magnet core K10, thereby extending the output pulse also to the output line B. The next following timing pulse $\alpha$ magnetizes the magnet core K10 again oppositely, etc., etc.

Accordingly, at the output A (FIG. 1) will appear pulses at the instants 1, 3, 5 . . . ms., and at the output B will appear pulses at the instants 2, 4, 6 . . . ms. The pulses appearing at the output B are extended to the winding 2 of the magnet core K11, such core forming with the magnet core K12 (FIG. 2) a timing reducer operating in accordance with the counting principle. The magnet core K11 is brought into a remanence position over its winding 1, by the pulses of the timing phase $\beta$, and is oppositely magnetized over its winding 2. A voltage is thereby produced in the output winding 3, which is extended over the rectifier D4 to the winding 2 of the counting core K12, thus effecting stepwise opposite magnetization thereof. After complete opposite magnetization, there will be produced at the resistor R13 an increased voltage drop which will make the transistor T13 conductive. The output pulse of the transistor T13, flowing over the restoring winding 1 of the counting core K12 restores such core to initial position. The divisor ratio of the counting core K12 is adjusted so that pulses appear at the collector of the transistor T13 at the instants 10, 20, 30 . . . ms. The adjustable resistor R2 serves for the matching. The bias for the transistor T13 is obtained at the point *a*.

The output pulses of the transistor T13 are conducted to the winding 2 of the magnet core K8. This core serves together with the transistor T10 for shortening the impulses of the transistor T13, which are about 50 microseconds long, to a length of about 8 microseconds. The magnet core K8 is over its winding 3 brought into a remanence position by the timing pulses of the timing phase $\beta$, and is oppositely magnetized over the winding 2, by the output pulses of the transistor T13. An impulse is thereby produced in the output winding 4, which makes the transistor T10 conductive. Accordingly, at the output of the transistor T10 will appear impulses at the instants 10, 20, 30 . . . ms., which are extended over the windings 2 of the magnet cores K13 and K14.

The magnet cores K13, K14 form with the transistors T14 and T15 (FIG. 2) a ring counter of the kind represented by the distributor which comprises the magnet cores K9, K10 and the transistors T11, T12 (FIG. 1). Accordingly, there will be obtained, at the output A' (FIG. 2), impulses at the instants 10, 30, 50 . . . ms., and at the output B' will be obtained impulses at the instants 20, 40, 60 . . . ms. The impulses appearing at the output A' are conducted to the windings 2 of the magnet cores K15, K3 and K4.

The magnet core K15 forms with the magnet core K16 (FIG. 2) a frequency divider, operating in accordance with the count core principle, which in the assumed embodiment, has a count capacity of 7, corresponding to the 7 elements of a start-stop telegraph symbol coded in the 5-element telegraph code. After complete opposing magnetization of the count or counting core K16, there will appear an increased voltage drop at the resistor R6, which is effective to make the transistor T16 conductive. However, as compared with the counting core K12, the counting core K16 is after full opposing magnetization not restored to initial condition; accordingly, there will be an increased voltage drop at the resistor R6, with each further impulse delivered by the core K15, and the transistor T16 will become conductive. The count core K16 will be over its winding 1 restored to its initial condition only upon appearance of the next following start impulse.

As explained before, when there is a start element potential (polarity) on the input E, the transistor T2 is conductive and the transistor T3 is at cutoff. The magnet cores K5 and K4 (gates) are accordingly held in the negative saturation condition, over their windings 3, while the magnet core K3 is in the negative remanence position. The magnet core K3 is therefore over its winding 2 oppositely magnetized, by the impulse at the output A' appearing at the instant 10, while the magnet core K4 is held in the negative saturation condition by the strong current flowing over its winding 3. As a consequence, there will appear an impulse in the output winding 4 of the magnet core K3, such impulse being extended over the rectifier D5 to a bistable output amplifier (not shown) which is connected to the output O (FIG. 2), as an indication that there is start-potential at the input E of the distortion correction device.

Upon subsequent appearance of stop-potential at the input E, the transistor T3 will become conductive while the transistor T2 will become blocked, and the magnet cores K1 and K3 will be held in the negative saturation condition, over the winding 3 thereof, while the magnet core K4 will be in the negative remanence condition. The respective magnet cores K3, K4, are brought into the negative remanence condition over the winding 1 thereof, by the impulses appearing at the output B', whenever they are in the positive remanence condition. As a consequence, an output impulse will at the instant 30 ms. appear in the output winding 4 of the magnet core K4, which impulse is extended over the rectifier D6 to the output amplifier, serving as an indication that there is a stop-potential at the input E of the distortion correction circuit.

As explained before, the transistor T16 will become conductive, after the delivery of 7 sampling pulses at the output A' (FIG. 2), and will cause opposite magnetization of the magnet core K5 (gate), over the winding 1 thereof, provided that this core K5 is not held in the negative saturation condition over its winding 3. The winding 2 of the magnet core K5 is over the rectifier D3 in positive feedback, thus supporting this opposing magnetization operation. Owing to the opposing magnetization, there will appear a voltage in the output winding 4 of the magnet core K5, which effects over the rectifier D2 opposite magnetization of the magnet core K6 over the winding 1 thereof. This happens at the instant of the seventh sampling pulse at the output A' (FIG. 2), that is, at the instant 130 ms. The next impulse at the output A (FIG. 1) which appears at the instant 131 ms., causes the magnet core K6 to be oppositely magnetized over its winding 2, thereby inducing in the output winding 3 thereof a voltage which makes the transistor T8 (FIG. 2) conductive. The magnet core K7 is by the impulses from the output B' extending over its winding 1, in the negative remanence condition, and is oppositely magnetized by the output impulse of the transistor T8 extended over its winding 2. The output impulse of the transistor T8 is at the same time conducted to the winding 2 of the magnet core K11 (FIG. 1), which also receives impulses from the output B.

The distortion correction cycle is thereby, according to the CCITT-Recommendation B21, shortened by 2 milliseconds, so that the next sampling pulse appears at the output A' at the instant 148 ms. The stop element is thus transmitted with a minimum length of 18 milliseconds.

The magnet core K7 (FIG. 2) is over its winding 1 again oppositely magnetized by the impulse appearing at the output B' (FIG. 2) at the instant 138 ms., a voltage being thereby induced in the output winding 3 which makes the transistor T9 (FIG. 2) conductive. The output impulse from the transistor T9 flows over the winding 3 of the magnet core K2 (FIG. 1), thereby causing opposing magnetization of such core.

The circuit arrangement is now again in its initial condition, ready for a new distortion correction cycle which will be initiated by the appearance of the next following element with start-potential at the input E (FIG. 1).

As will be seen from the foregoing explanations, sampling pulses are also extended to the windings 2 of the sampling magnet cores K3, K4 (FIG. 2), in the initial position of the circuit arrangement, thus effecting sampling of the potential at the distortion corrector input, and thereby transmitting the potential at the distortion corrector input to the distortion corrector output, also during the pauses between telegraph symbols. As already described, the restoration of the counters is effected only by the start impulse which is released with start potential upon appearance of the next element at the input of the distortion corrector.

It has been assumed in connection with the foregoing explanations, that the magnet core K5 (FIG. 2) is, upon appearance of the first output impulse of the transistor T16, in the negative remanence condition, and that such core can accordingly be oppositely magnetized by this output impulse, over its winding 1. This is, however, only the case when there is, at such instant, stop-potential at the distortion corrector input, that is, when the transistor T2 is at cutoff, and the transistor T3 (FIG. 1) conductive, thus restoring the magnet core K5 over its winding 3. However, in case there is at such instant start-potential at the input, that is, when the transistor T2 is conductive and the transistor T3 at cutoff, the magnet core K5 will be held in the negative remanence condition, over its winding 3, and the first output pulse from the transistor T16 (FIG. 2) will remain ineffective with respect to the magnet core K5. Accordingly, the magnet core K5 is oppositely magnetized by an output pulse from the transistor T16, only when there is stop-potential at the input E (FIG. 1). The stop impulse is consequently released only when there is stop-potential at the input. It follows, therefore, that the described circuit arrangement is adapted to transmit corrected symbols coded in the 5-element telgraph code as well as symbols coded in the 6-element code.

It is understood that the circuit arrangement can also be constructed in accordance with another technique, for example, with flip-flop stages. The described and illustrated embodiment, employing the magnet core technique can however be made at lower cost.

Changes may be made within the scope and spirit of the appended claims which define what is believed to be new and desired to have protected by Letters Patent.

I claim:

1. A circuit arrangement for correcting distortion of telegraph symbols which are transmitted in start-stop operation, comprising an input circuit at which the symbols to be corrected, and start and stop element polarities are received, and an output circuit to which the corrected signals are delivered, means for providing timing pulses of a higher frequency than the pulse sequence frequency of the telegraph symbols, means for counting said timing pulses and deriving therefrom sampling pulses for effecting a sampling of the polarity of the elements of the symbols appearing at said input circuit, from which corrected elements are to be extended to said output circuit, an element counter which is operatively stepped by the sampling pulses, said element counter being operatively connected to said input circuit and operative, upon reaching a predetermined counter corresponding to the number of elements in the telegraph symbol, to retain such count irrespective of the appearance of further sampling pulses, a gating circuit, means for conducting to said gating circuit control pulses including pulses from said element counter and said further sampling pulses, said gating circuit becoming conductive for sampling pulses upon appearance of stop element polarity at the input circuit and thereby prepare the release of a stop impulse, means operatively connected to said counting means and to said gating circuit, responsive to output pulses from said gating circuit, for preparing the restoration of the circuit arrangement to initial condition, said counting means being operative to produce sampling pulses even after appearance of stop element polarity, whereby the polarity at the input circuit is operatively conducted to the output circuit during the pauses between individual telegraph symbols, and means operatively connected to said input circuit, responsive to the appearance of start element polarity thereat, following a stop impulse conducted over the gating circuit, for restoring said counter and said counting means to normal condition.

2. A circuit arrangement according to claim 1 comprising means connected to said counting means for producing two timing impulses which are phase shifted by 180°, and means operatively connected to said counting means for effecting a selection from the two phase shifted impulses whereby the selected impulse, following conductance of said last mentioned impulse producing means, may be employed as means for designating as a stop impulse an impulse from said phase shifted impulses.

3. A circuit arrangement according to claim 1, wherein the stop impulse is released by the impulse, following after said gate has become conductive, which impulse is phase shifted by 180° with respect to the sampling pulses.

4. A circuit arrangement according to claim 3, comprising means, depending upon the appearance of the sampling pulse preceding said stop impulse, for conducting an auxiliary impulse to the counter which counts the impulses of a timing pulse of higher frequency.

5. A circuit arrangement according to claim 1, wherein the counters are constructed of magnet cores with approximately rectangular hysteresis loop.

6. A circuit arrangement according to claim 5, wherein said element counter comprises a counting core which is oppositely magnetized stepwise in the rhythm of the sampling pulses, by the action of a preceding quantizing core, said counting core remaining in the full opposing magnetization attained thereby and therefore delivering output impulses responsive to further sampling pulses.

7. A circuit arrangement according to claim 5, comprising two magnet cores for the element center scanning, one of said cores being held in a saturation condition corresponding to the potential prevailing at the input of the circuit arrangement to prevent transmission, to an output flip stage, of sampling pulses conducted to both said cores.

8. A circuit arrangement according to claim 7, wherein said cores are, by the timing pulse which is with respect to the sampling pulses phase shifted by 180°, placed into a saturation position opposite to that into which they are placed by the sampling pulses.

References Cited by the Examiner

UNITED STATES PATENTS

| | | | |
|---|---|---|---|
| 2,685,613 | 8/54 | Liguori | 178—70 |
| 2,749,386 | 6/56 | Wright | 178—70 |
| 2,752,425 | 6/56 | Dain | 178—70 |
| 2,843,669 | 7/58 | Six et al. | 178—70 |
| 2,898,404 | 8/59 | Alizon | 178—70 |
| 3,008,006 | 11/61 | Van Berkel | 178—70 |

NEIL C. READ, *Primary Examiner.*

ROBERT H. ROSE, *Examiner.*